United States Patent [19]
Massey

[11] 3,835,524
[45] Sept. 17, 1974

[54] METHOD OF MANUFACTURING REJUVENATED SCARFING BLOCKS

[75] Inventor: John M. Massey, Dearborn, Mich.

[73] Assignee: Massey Welding Company, Dearborn, Mich.

[22] Filed: Aug. 13, 1973

[21] Appl. No.: 387,763

[52] U.S. Cl. ............ 29/401, 29/157 C, 29/464, 29/501, 29/481, 29/DIG. 4, 228/44
[51] Int. Cl. ............ B23p 7/00, B23k 31/02
[58] Field of Search ........ 29/157 C, 401, 464, 481, 29/501, 559, DIG. 4; 148/9.5; 266/23 H 228/44

[56] References Cited
UNITED STATES PATENTS

| | | | |
|---|---|---|---|
| 2,363,250 | 11/1944 | Jenkins | 29/157 C |
| 2,483,483 | 10/1949 | Thompson et al. | 266/23 H |
| 2,897,883 | 8/1959 | Miller | 266/23 H |
| 3,662,447 | 5/1972 | Schweng et al. | 29/157 C |
| 3,675,309 | 7/1972 | Borkoski | 29/401 |

Primary Examiner—C. W. Lanham
Assistant Examiner—D. C. Reiley, III
Attorney, Agent, or Firm—Harness, Dickey & Pierce

[57] ABSTRACT

A new method for manufacturing rejuvenated scarfing blocks which are used for scarfing (i.e., the heat cleaning or thermochemical conditioning of) the surfaces of steel slabs in steel mills.

21 Claims, 9 Drawing Figures

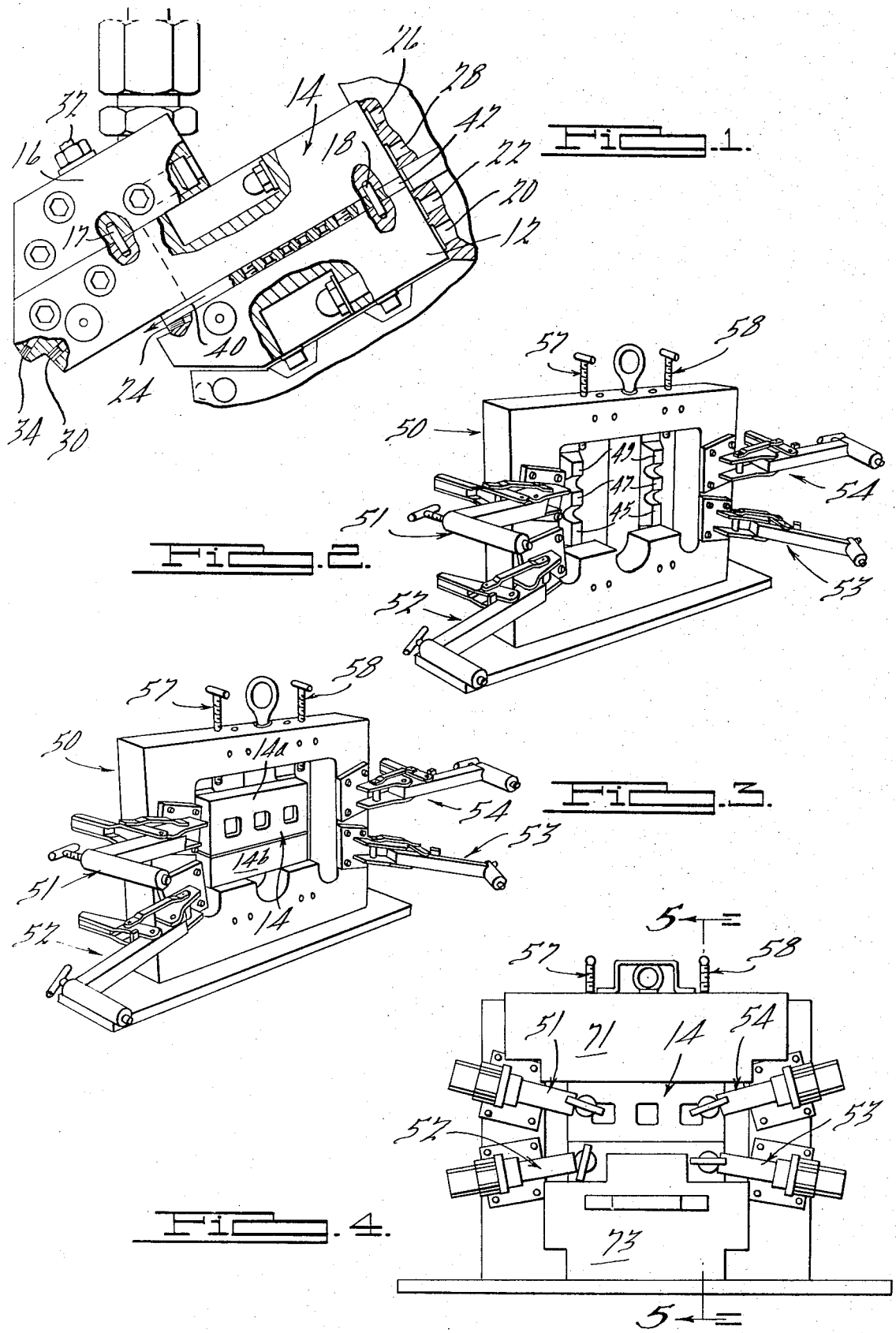

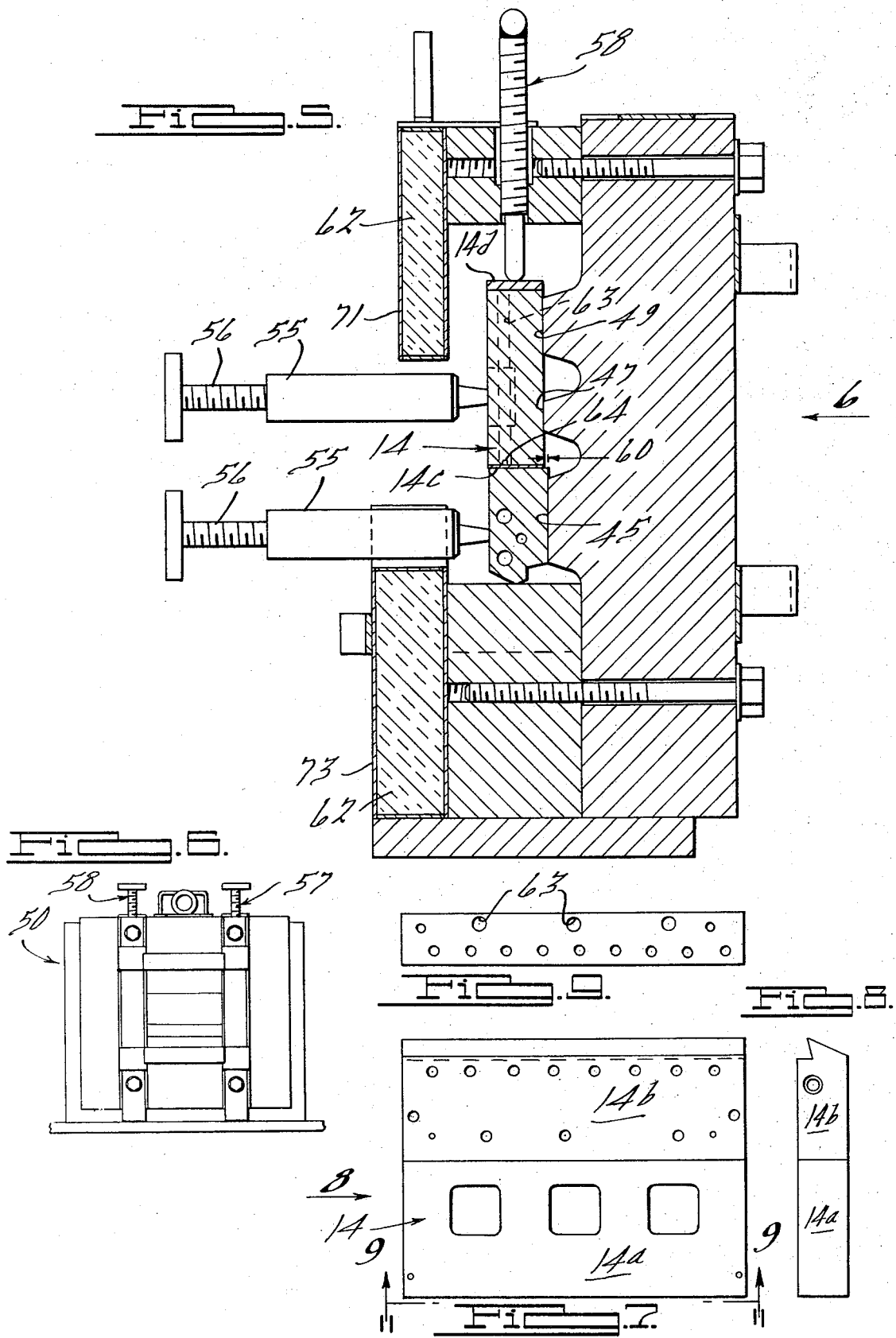

METHOD OF MANUFACTURING REJUVENATED SCARFING BLOCKS

BACKGROUND OF THE INVENTION

This invention broadly relates to a new method of manufacturing scarfing blocks. More particularly this invention relates to a method of manufacturing rejuvenated oxygen trap scarfing blocks.

The state of the art is indicated by U.S. Pat. No. 3,647,570 issued to T. J. Lytle, the disclosure of which is incorporated herein by reference.

Accordingly the primary object of this invention is to provide a new and improved method of manufacturing highly useful scarfing blocks.

Another object of the present invention is to provide a new and improved method of manufacturing rejuvenated oxygen trap scarfing blocks.

Other objects, features and advantages of the present invention will become apparent from the subsequent description and the appended claims taken in conjunction with the accompanying drawings.

BRIEF DESCRIPTION OF THE DRAWINGS

FIG. 1 is a side elevation of a scarfing unit partially in cross section;

FIGS. 2 through 6 illustrate a special fixture means used in the invention herein;

FIGS. 7, 8 and 9 illustrate a scarfing block in accordance with the invention herein.

SUMMARY OF THE INVENTION

Briefly stated, the present invention comprises a method of manufacturing rejuvenated oxygen trap scarfing blocks which contain trap oxygen ports, comprising the steps of, severing the block to remove a damaged nose portion from the main part of the block, preparing the surface of the main block such that it is ready for subsequent attachment of a new nose block, applying flux to both of said blocks and to a thin brazing shim member which is positioned between the surfaces of said blocks to be welded together, positioning said blocks one above the other with the new nose block down in a special fixture means for insulating and holding the blocks in properly aligned position during a high temperature welding operation, heating the blocks within the fixture means to a temperature of at least about 1,500° F. to fuse the shim member to the blocks, further heating the blocks to provide even shim brazing and weld the blocks together, cooling and removing the welded block from the fixture, machining the new nose portion and drilling the required holes therein to provide passages for the oxygen trap stream and the natural gas streams which pass through the nose.

In another aspect, the present invention comprises the steps of severing the block to remove a damaged nose portion from the main part of the block, preparing the surface of the main block such that it is ready for subsequent attachment of a new nose block, applying flux to both of said blocks and to a thin brazing shim member which is positioned between the surfaces of said blocks to be welded together, positioning said blocks one above the other in a special fixture means for insulating and holding the blocks in properly aligned position during a high temperature welding operation, heating the blocks within the fixture means to a temperature of at least about 1,400°–1,700° F. to fuse the shim member to the blocks, further heating the blocks to provide even shim brazing and weld the blocks together, cooling and removing the welded block from the fixture, machining the new nose portion and drilling the required holes therein to provide passages for the gas streams which pass through the nose.

DESCRIPTION OF PREFERRED EMBODIMENTS

Turning now to the drawings, FIG. 1 illustrates a scarfing unit designated 10 comprised of a lower preheat block 12 and upper preheat block 14 and an oxygen manifold block 16 positioned on the upper preheat block 14 by locating pins such as 17. The upper preheat block 14 is positioned on the lower preheat block 12 and located relative thereto by locating pins such as 18. Water to cool the lower preheat block 12 is introduced at 20. The fuel gas flow through the lower preheat block 12 is introduced at 22 and passes out of the fuel gas tips 24. Water for cooling the upper preheat block 14 is introduced at 26 and fuel gas which flows through the upper preheat block 14 is introduced at 28 and passes out the fuel gas tips 30 in the upper preheat block 14.

The trap oxygen stream for the upper preheat block 14 enters at line 32 to the oxygen attachment block 16 and flows through this block 16 which acts as a manifold to distribute the trap oxygen stream for passage out the trap oxygen stream tips 34. The main oxygen scarfing stream flows out the passage 40 formed between the lower preheat block 12 and upper preheat block 14. Oxygen for this main oxygen scarfing stream 40 is introduced at 42. The steel slab surface (not shown) passes from left to right just under the scarfing unit 10 during the scarfing operation.

The special fixture means used in the invention is designated 50 (see FIGS. 2–6). According to the invention herein scarfing blocks often become severely damaged and thus useable due to contact with a moving steel slab which is being scarfed. When this occurs the nose of the scarfing block, such as block 14, is severed from the block along the line 11 (FIG. 1). A new solid nose block 14b is then positioned in the special fixture means 50 and the base of the block 14a is positioned above the nose block 14b. The toggles designated 51, 52, 53 and 54 are for holding the blocks 14a and 14b in properly aligned position within the special fixture means 50 pressed against the locator surfaces 45, 47, 49 (FIG. 5).

Prior to closing of the toggles a brazing shim, such as a silver brazing shim, designating 14c is placed between the blocks 14a and 14b. Also a protecting bar 14d is placed across the top of the block 14a (see FIG. 5) to protect the copper face of the block 14a which has been ground to a desired finish.

The toggles such as 51, each include screw threaded sleeves 55 and threaded tightening screws 56. Two tightening screws 57 and 58 are also positioned at the top of the special fixture means 50. The new nose block 14b when positioned in the special fixture means is offset from the main portion of the block 14a by approximately 0.010–0.015 inches as shown at the dimension designated 60 in FIG. 5. This overhang is later machined off to form a smooth surface with the rest of the block.

The special fixture means designated 50 as discovered and disclosed herein is made of a special metal material (such as Inconel) which is capable of withstanding temperatures of at least about 3,200° F. The interior hollow portions of the special fixture means are filled with an insulating material 62. Following positioning of the blocks 14a and 14b one above the other with the nose block facing downwardly in the special fixture means 50, small brazing slugs designated 64 are dropped into at least one or more of the preexisting holes 63 in the main part 14a of the block prior to heating in order to give additional brazing around said holes 63 (FIG. 5 and 9). The silver shim which is preferred for use in the invention is a silver shim which melts at approximately 1,475° F. The special fixture means 50 also includes removable heat shields 71 and 73 which are placed over the front of the special fixture means after the blocks 14a and 14b are positioned therewithin through the use of tightened toggles 51–54.

In preferred detail the method of the invention is carried out as follows. A scarfing block 14 which is damaged and no longer usable has the nose portion thereof removed or severed off. A new solid nose block of the same approximate outer dimensions is then prepared. The blocks 14a and 14b in properly prepared condition then have a flux material applied to the surfaces thereof which come into contact with the silver shim 14c (one suitable flux is Handy and Harmen Co., Flux type B-1). The flux material is also applied to the silver shim and then the blocks are positioned in the special fixture means 50 as shown in FIG. 5 with an overhang dimension of preferably about 0.012 inches as indicated at 60. The blocks 14a and 14b with the shim therebetween are then tightened within the fixture through the use of the toggles 51–54. The insulating shields 71 and 73 then placed in position and gas heated blowers are used to heat the blocks to approximately 1,500° F. Following this, additional heat is applied (after removing the insulating covers 71 and 73 from the fixture) in order to give even silver brazing of the shim 14c. For this additional heating, for example, it is preferred to use a Harris Calorific torch to heat the blocks to about 1,700° F. Subsequent to this, the two top screws 57 and 58 are further tightened to engage the blocks in a final fusing operation. Then the blocks are cooled with an air blast to 1,200°–1,300° F. to prevent any annealling or softening of the blocks. The blocks are then removed from the fixture and finally air cooled. The fused block is then finally machined and subjected to a drilling operation to form the required holes therein to provide passages for the oxygen trap stream and the natural gas streams which pass through the new nose portion. After said machining and drilling certain transverse holes in the new nose portion are closed off by brazing in with coin shaped brazing slugs. Also at this point, small hollow cylindrical inserts are placed in each gas and/or oxygen outlet aperture as indicated at 14e and 14f in FIG. 1. The finished block when sealed has been found to be leakproof under 100 p.s.i. internal air pressure when submerged in water.

While it will be apparent that the preferred embodiments of the invention disclosed are well calculated to fulfill the objects above stated, it will be appreciated that the invention is susceptible to modification, variation and change without departing from the proper scope or fair meaning of the subjoined acclaims.

What is claimed is:

1. A method of manufacturing rejuvenated oxygen trap scarfing blocks which contain trap oxygen ports, comprising the steps of, severing the block to remove a damaged nose portion from the main part of the block, preparing the surface of the main block such that it is ready for subsequent attachment of a new nose block, applying flux to both of said blocks and to a thin brazing shim member which is positioned between the surfaces of said blocks to be welded together, positioning said blocks one above the other with the new nose block down in a special fixture means for insulating and holding the blocks in properly aligned position during a high temperature welding operation, heating the blocks within the fixture means to a temperature of at least about 1,500 °F to fuse the shim member to the blocks, further heating the blocks to provide even shim brazing and weld the blocks together, cooling and removing the welded block from the fixture, machining the new nose portion and drilling the required holes therein to provide passages for the oxygen trap stream and the natural gas streams which pass through the nose.

2. The invention of claim 1 wherein, small brazing slugs are dropped into at least one pre-existing hole in said main part of the block prior to heating in order to give additional brazing around said at least one hole.

3. The invention of claim 1 wherein, said new nose block when positioned in said special fixture means is offset approximately 0.010 – 0.015 inches relative to the main part of the block which offset is later machined off to form a smooth surface with the main part of the block.

4. The invention of claim 1 wherein, said fixture means is made primarily of a special metal material capable of withstanding temperatues up to at least about 3,200 °F.

5. The invention of claim 1 wherein, said fixture means include toggles with screw threaded sleeves and threaded tightening screws near the end thereof.

6. The invention of claim 1 wherein, said shim is a silver shim which melts at about 1,475 °F.

7. The invention of claim 1 wherein, said further heating is carried out with a torch to heat the blocks to about 1,700 °F.

8. The invention of claim 1 wherein, after said further heating the fixture means is slightly vertically compressed by the use of tightening screw means to engage the blocks in final fused relationship.

9. The invention of claim 1 wherein, said cooling is carried out in the fixture means until the fused block reaches a temperature of about 1,200°–1,300 °F to prevent undesired annealling; and then said block is removed and finally cooled.

10. The invention of claim 1 wherein, after said machining and drilling, certain transverse holes in said nose are closed off by brazing in with coin-shaped brazing slugs.

11. The invention of claim 1 wherein, after said machining and drilling, small hollow cylindrical inserts are placed in each gas and/or oxygen outlet aperture.

12. The invention of claim 1 wherein, the finished block when sealed is leak-proof under 100 psi internal air pressure when submerged in water.

13. A method of manufacturing rejuvenated oxygen trap scarfing blocks comprising the steps of, severing the block to remove a damaged nose portion from the main part of the block, preparing the surface of the main block such that it is ready for subsequent attachment of a new nose block, applying flux to both of said blocks and to a thin brazing shim member which is positioned between the surfaces of said blocks to be welded together, positioning said blocks one above the other in a special fixture means for insulating and holding the blocks in properly aligned position during a high temperature welding operation, heating the blocks within the fixture means to a temperature of at least about 1,400–1,700 °F to fuse the shim member to the blocks, further heating the blocks to provide even shim brazing and weld the blocks together, cooling and removing the welded block from the fixture, machining the new nose portion and drilling the required holes therein to provide passages for the gas streams which pass through the nose.

14. The invention of claim 13 wherein, small brazing slugs are dropped into at least one pre-existing hole in said main part of the block prior to heating in order to give additional brazing around said at least one hole.

15. The invention of claim 13 wherein, said new nose block when positioned in said special fixture means is offset approximately 0.010 – 0.015 inches relative to the main part of the block which offset is later machined off to form a smooth surface with the main part of the block.

16. The invention of claim 13 wherein, said fixture means is made primarily of a special metal material capable of withstanding temperatures up to at least about 3,200 °F.

17. The invention of claim 13 wherein, said fixture means include toggles with screw threaded sleeves and threaded tightening screws near the end thereof.

18. The invention of claim 13 wherein, said shim is a silver shim which melts at about 1,475 °F.

19. The invention of claim 13 wherein, said further heating is carried out with a torch to heat the blocks to about 1,600°–1,900 °F.

20. The invention of claim 13 wherein, said cooling is carried out in the fixture means until the fused block reaches a temperature of about 1,200°–1,300 °F to prevent undesired annealling; and then said block is removed and finally cooled.

21. The invention of claim 13 wherein, the finished block when sealed is leak-proof under 100 psi internal air pressure when submerged in water.

* * * * *

UNITED STATES PATENT OFFICE
CERTIFICATE OF CORRECTION

Patent No. 3,835,524      Dated September 17, 1974

Inventor(s) John M. Massey

It is certified that error appears in the above-identified patent and that said Letters Patent are hereby corrected as shown below:

Column 3, line 36, after "73" insert --are--.

Column 4, claim 4, line 42, "temperatues" should be --temperatures--.

Signed and sealed this 3rd day of December 1974.

(SEAL)
Attest:

McCOY M. GIBSON JR.
Attesting Officer

C. MARSHALL DANN
Commissioner of Patents